Patented Oct. 27, 1953

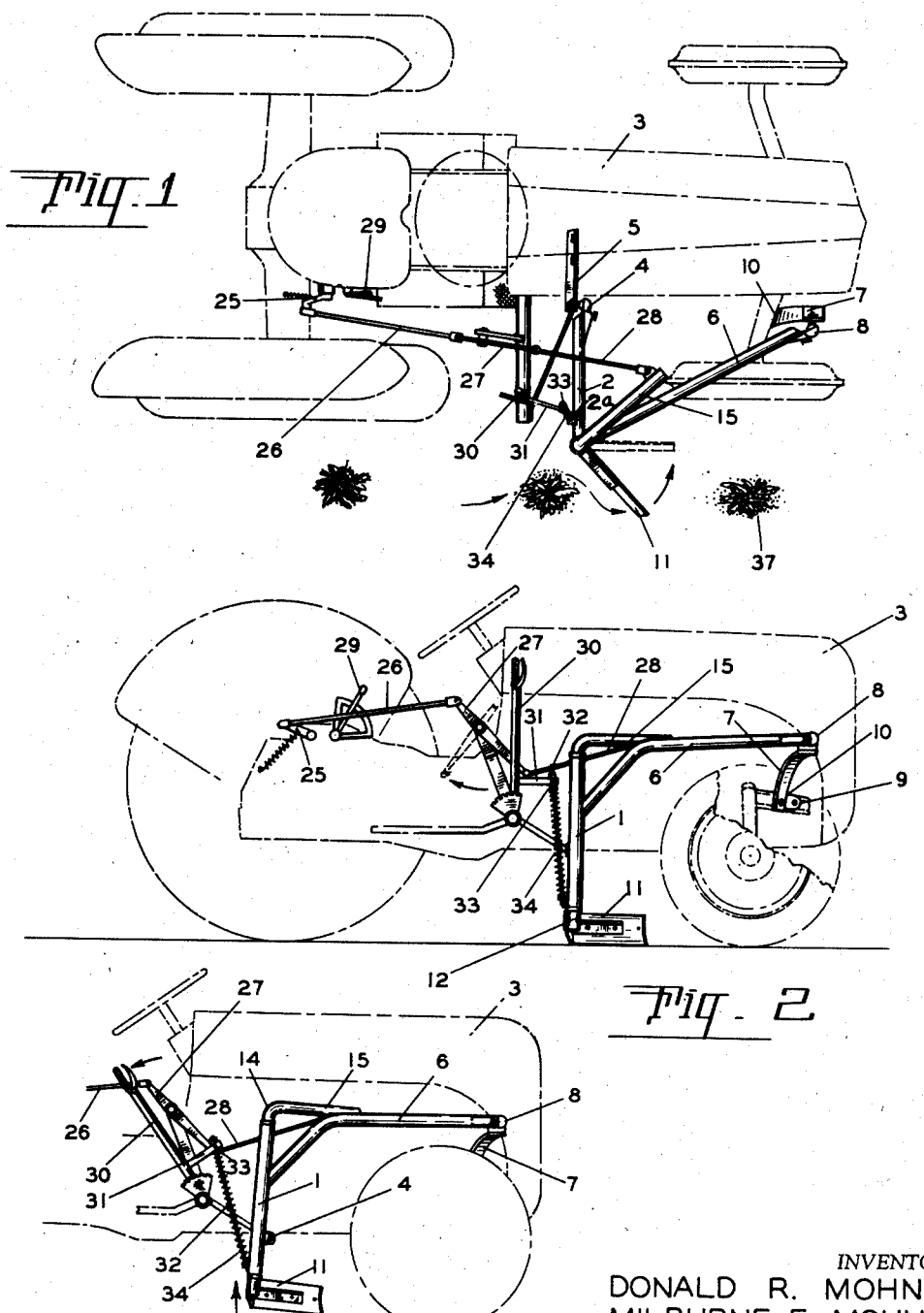

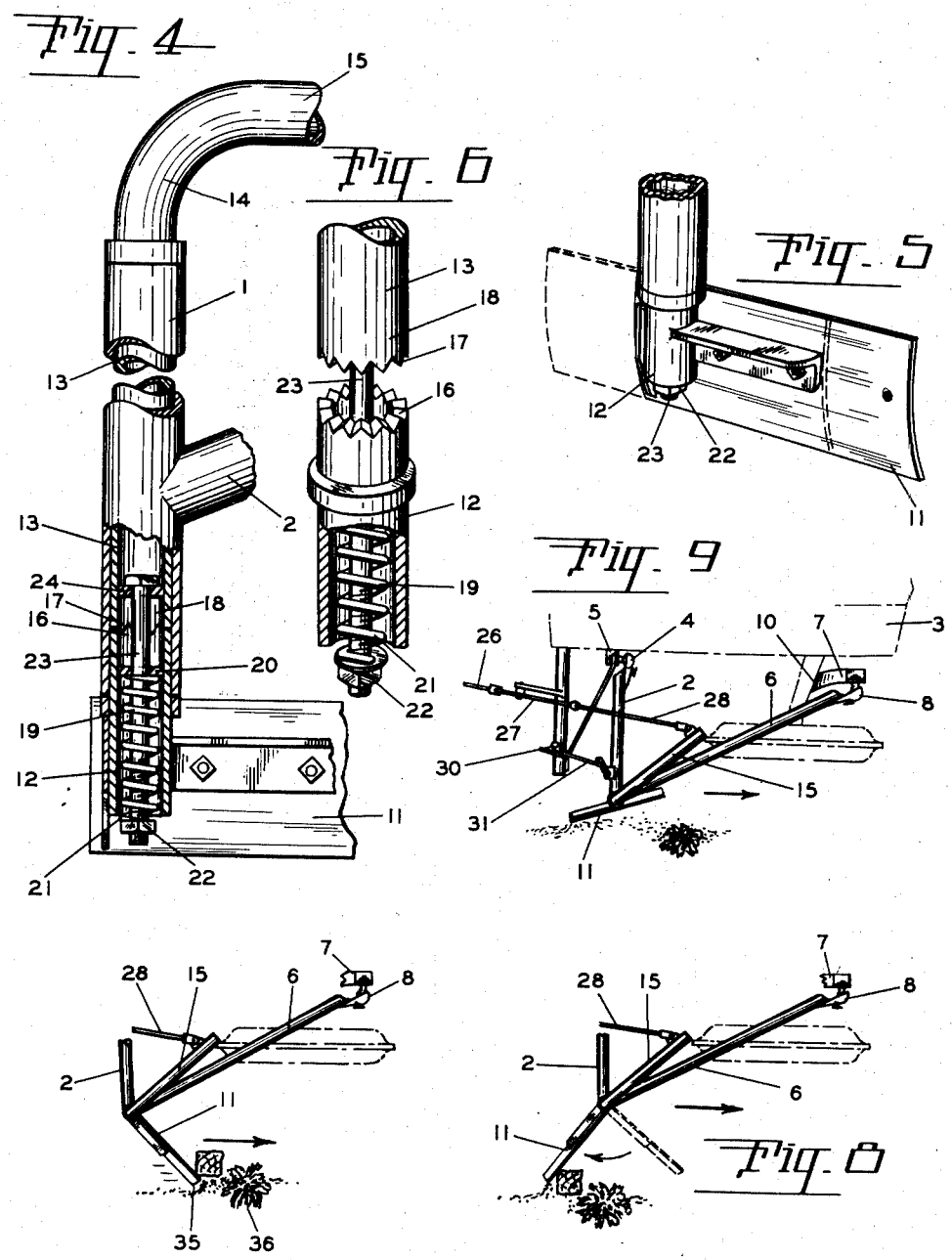

2,656,777

UNITED STATES PATENT OFFICE 2,656,777

TRACTOR ATTACHED GRUB HOE

Donald R. Mohn, Troutdale, Milburne E. Mohn, Portland, Oreg.

Application August 18, 1949, Serial No. 110,898

1 Claim. (Cl. 97—47.37)

This invention relates to improvements in grub hoes and is particularly adapted to be attached to tractors.

The primary object of the invention is to mount a grub hoe to a tractor for cultivating between berry plants and the like, said grub hoe mechanism being manipulated by power take off controls associated with the tractor.

A further object of the invention is to provide a safety release mechanism within the assembly for releasing the blade of the hoe in the event the same strikes an obstruction.

Another object of this feature is to permit the conversion of the blade from grubbing between the plants to hilling up of the plants by the soil.

A still further object of the invention is the provision of operating means for moving the grubbing blade in and out between the plants by either power supplied from the tractor or manually.

These and other incidental objects will be apparent in the drawings, specification and claim.

Referring to the drawings:

Figure 1 is a plan view of our new and improved grub hoe attached to a conventional tractor.

Figure 2 is a side view of Figure 1.

Figure 3 illustrates the operation of the raising and lowering mechanism associated with the grub hoe assembly.

Figure 4 is a fragmentary view of the blade and its associated supporting elements, shown partially in section.

Figure 5 is a perspective view of the blade and method of attaching the same to the said supporting elements.

Figure 6 is an enlarged perspective detail of the blade supporting unit showing the same in a position to be moved from one position to the other.

Figure 7 illustrates the position of the grub hoe while cultivating between the plants and about to engage an obstruction.

Figure 8 illustrates the blade having contacted the obstruction and moved to the position illustrated without breaking the associated elements.

Figure 9 is a view illustrating the position of the blade for hilling up the plants, the same having been moved thereto by my improved blade mounting.

Referring more specifically to the drawings:

Our new and improved grub hoe assembly consists of a vertical tubular bearing 1 having a brace 2 forming part thereof and extending towards the tractor 3, and secured to the tractor by a ball and socket connection 4 to the bracket 5, which is secured to the tractor by any suitable means.

A second brace 6 extends forward towards the bracket 7 and is connected thereto by a ball and socket arrangement 8, the said bracket 7 being fixedly secured to the tractor at 10. The braces 2 and 6, through the ball and socket joints 4 and 8, permit the bearing 1 to be raised and lowered together with the grubbing blade 11. The grubbing blade 11 is secured to a hollow member 12, which is rotatably and slightly slidably mounted in the lower end of the tubular bearing 1, best illustrated in Figures 4, 5 and 6.

Extending through the tubular bearing 1 is a hollow shaft 13, bent at its upper end at 14, terminating in handle 15. Located on the upper end of the hollow member 12 are ratchet teeth 16 adapted to engage the ratchet teeth 17 formed on the lower end 18 of the hollow shaft 13. These teeth are forced to engage one another by a spring 19 bearing at its upper end against a partition 20 in the hollow member 12, as best illustrated in Figure 4, while its lower end 21 engages a nut 22 on a bolt 23, whose upper end is in engagement with a partition 24 in the lower end of the shaft 13. The tension of the spring serves to hold the teeth 16 and 17 together, the degree of tension depending upon the position of the nut 22 on the bolt 23. The object of this form of mounting will be described in the operation of our new and improved grub hoe.

Referring to Figure 1, the position of the grubbing blade between the broken line position and the full line position, or in other words the angle of the blade relative to the direction of travel, is determined by the position of the crank 15, which in turn is controlled by the power lift crank 25 of the tractor through the connecting rod 26, walking beam 27 and link 28. The power lift crank 25 is controlled by the control lever 29, which is part of the tractor and forming no part of our invention, except that we use the said power lift and control lever in the operation of our grub hoe.

The depth of the blade 11 is governed by the lever 30, which has a crank arm 31 extending therefrom and connected to a rod 32 which extends down to and through a lug 2a formed on the brace 2. This rod determines the depth of the blade, but in the event the blade strikes an obstruction the rod 32 slides in the fitting 33 of the crank 31 compressing the spring 34 allowing the bearing and the parts connected thereto to raise, allowing the blade to pass over the obstruction. The spring 34 exerts a constant pressure downward from the crank 31, forcing the blade 11 into the ground, but as stated above allowing it to move upward in case of obstructions.

We do not wish to be limited to the exact leverages illustrated, as various tractors require modifications in the operating connections, but the general principle of revolving the blade 11 about a vertical center line to govern the angle of attack of the grubbing action is one of the primary objects of our invention, together with the fact that the depth is governed by a positive adjustment but that will release the blade permitting it to raise in the event of striking some obstacle. A further feature of the construction employed in our grub hoe assembly is demonstrated in Figures 7 and 8.

In the event the blade 11 strikes an obstacle, as illustrated at 36, the spring within the hollow member 12 will permit the teeth 16 of the said hollow member to back away from the teeth 17 of the hollow shaft 13 permitting the blade to turn to the position as illustated in Figure 8, thereby protecting the equipment and preventing breakage. The operator may then manually revolve the blade back to its normal position by forcibly rotating the same causing the teeth 16 and 17 to slip by one another.

When it is desired to hill the rows of plants, as illustrated in Figure 9, the operator may forcibly revolve the blade to the position illustrated, the teeth 16 and 17 of the hollow member 12 and the hollow shaft 13 permitting the rotation, but still holding the blade in a normal position while in operation. This feature is one of the primary and most outstanding objects of our invention.

In the operation of our new and improved grub hoe, as the tractor moves forward, as illustrated in Figures 1 and 2, the operator manipulates the control lever 29 causing the power lift crank 25 to pull the rod 26 oscillating the walking beam 27, thereby pulling the link 28 moving the handle 15 so as to cause the blade to move to the broken line position avoiding the plants 37 when the blade is passing them, otherwise the blade remains in the row between the plants cultivating the ground between each operation of the control lever 29. This same action takes place when the grub hoe is being used as in Figure 9 for hilling up the plants. As stated above the lever 30 controls the depth of the blade.

Although certain specific embodiments of the invention have been shown and described, it is obvious that many modifications thereof are possible. The invention, therefore is not to be restricted except in so far as is necessitated by the prior art and by the spirit of the appended claim.

What I claim is:

A grub hoe for tractors comprising a vertically disposed tubular bearing, a hollow rotative shaft mounted in the tubular bearing, the upper end of said hollow shaft being bent to form a handle, a series of ratchet teeth formed on the lower end of said hollow shaft, a partition formed in the hollow shaft above the series of ratchet teeth, the partition having an opening, a tubular member rotatably and slidably mounted in the lower end of the vertically disposed tubular bearing, a series of ratchet teeth formed on the upper end of the tubular member normally in mesh with the series of ratchet teeth on the lower end of the rotatable hollow shaft, a partition in the tubular hollow member below the series of ratchet teeth on the upper end of said tubular member, said latter partition having an opening, a bolt having a head engaging the upper surface of the partition in the rotatable shaft, the stem of the bolt extending through the opening in the before-mentioned partitions, an adjusting nut on the lower end of the bolt, a spring interposed between the adjusting nut and the partition in the tubular member, the tension of said spring normally retaining the two series of ratchet teeth in engagement, a grub hoe fixed to the lower end of the tubular member, a brace fixed to and extending from the tubular bearing, means at the end of the brace to universally connect said brace to a tractor, a link pivoted to and extending from the free end of the handle, means on a tractor connected to the link to operate the handle, a second brace extending from the lower portion of the tubular bearing member, means at the free end of the second-mentioned brace to universally connect said brace to a tractor, a lever on the tractor, said lever having a crank at its lower end, a lug on the second-mentioned brace, a swivel connection on the crank, a rod pivoted to the lug and extending through the swivel connection, and a spring mounted on the rod and interposed between the swivel connection and the lug to permit the hoe to ride over obstructions independent of movement of the lever and crank.

DONALD R. MOHN.
MILBURNE E. MOHN.

References Cited in the file of this patent

UNITED STATES PATENTS

| Number | Name | Date |
|---|---|---|
| 974,670 | Jenkins | Nov. 1, 1910 |
| 1,840,682 | Sheldrick et al. | Jan. 12, 1932 |
| 2,218,187 | Wigle | Oct. 15, 1940 |
| 2,253,130 | Lund | Aug. 19, 1941 |
| 2,327,937 | Smith | Aug. 24, 1943 |
| 2,432,633 | Sirp | Dec. 16, 1947 |
| 2,437,581 | Wray | Mar. 9, 1948 |
| 2,482,751 | Hartsock et al. | Sept. 27, 1949 |